United States Patent Office 3,154,243
Patented Oct. 27, 1964

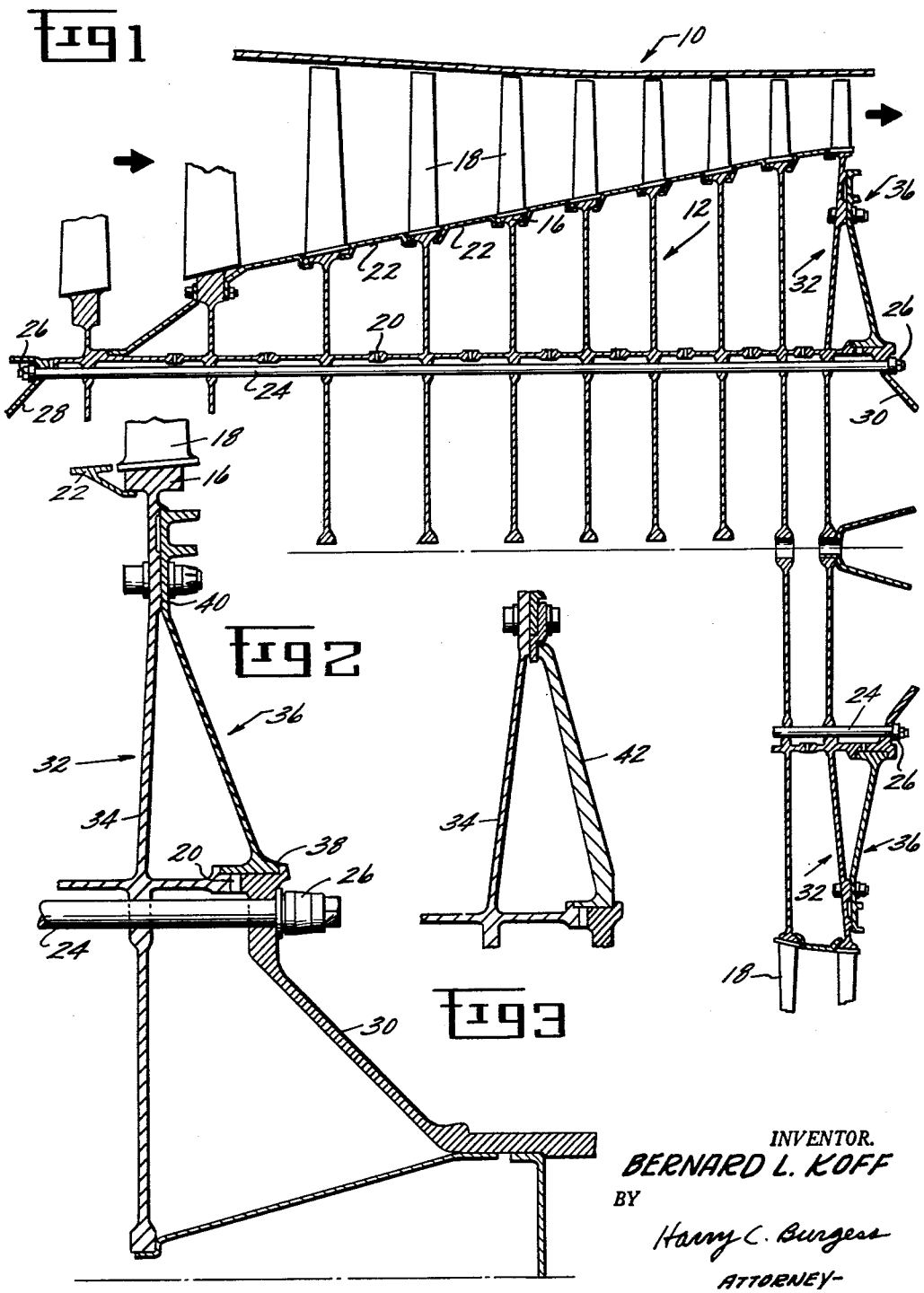

3,154,243
LIGHTWEIGHT AXIAL FLOW ROTOR
CONSTRUCTION
Bernard L. Koff, Cincinnati, Ohio, assignor to General
Electric Company, a corporation of New York
Filed Sept. 21, 1962, Ser. No. 225,399
1 Claim. (Cl. 230—134)

The present invention relates to a lightweight, axial-flow rotor construction and, more particularly, to means for stabilizing undesirable motion of the peripheral area of a relatively large conical disk located at the rear of the motor.

With the advent of high speed supersonic aircraft it has become important to design jet engines which are capable of very high performance yet, at the same time, are extremely lightweight in construction. In turbojet engines of the axial-flow type, for example, it has become common to utilize a plurality of relatively thin-walled annular disks, the disks supporting a plurality of airfoils or blades at the peripheries thereof. These lightweight disks are spaced axially in the compressor rotor and are held in position by any one of a variety of known coupling means such as, for example, cylindrical flanges having splined or interengaging face-toothed couplings. Other lightweight rotor designs have included disks with combination coupling and spacing members located adjacent the disk rims, the combination members also functioning to provide the inner boundary for the fluid flow path in the turbomachine.

Of necessity, in a large diameter lightweight turbojet engine, where the comrpessor itself is supported on two bearings or connected to small diameter stub shafts, there is a significant difference in the diameter of the forward-most blade disks as compared to those at the rear of the compressor, where the blades are much shorter. There is an even sharper transition from the large diameter rearward-most disk to the small diameter rear stub shaft. Considerations of optimum weight or the natural frequency of vibration of the structural components of a large, lightweight axial-flow turbojet engine compressor have sometimes made it necessary that the disk coupling means be located in a radial plane extending parallel to the axis of the rotor approximately half-way between the rim and center area of the largest disk, i.e., the rearward-most disk. This, however, results in a relatively large "unsupported" rear disk coupled by a spacer member adjacent the rim. Due to the high speed supersonic flight operation of modern aircraft, the lightweight compressor rotor rotates at necessarily high speeds and is, therefore, subject to unusually large flight maneuver forces and extreme thermal transients. Thus, the unsupported rearward-most disk must be restrained from moving axially under these loads, particularly adjacent the rim area. These loads are particularly great in the case of a lightweight, axial flow compressor wherein thin-walled spacer members transmit the disk periphery or rim loads of the forward disks back to the rearward-most disk rim. Some means must be provided to counteract or compensate for the increased loads in such a construction wherein the disk diameters increase relatively sharply from the front to the rear of the compressor with the rear stage being largely unsupported. Finally, the large diameter, relatively thin disks used in jet engine compressors of this type are subjected to thermal transients which induce relatively large axial deflections. In other words, the disk rim or periphery cools at a faster rate than the thin web portion of the disk extending towards the center of the compressor, which causes the disk to bow and tend to assume a more conical shape.

Accordingly, an object of the present invention is to provide a lightweight, axial-flow jet engine rotor construction wherein both flight maneuver forces and thermal operating transients are absorbed by the rotor both axially and radially.

Briefly stated, one embodiment of the invention comprises a large, lightweight turbojet engine compressor rotor construction having a plurality of relatively thin annular disks arranged in order of increasing diameter from the front to the rear of the compressor, the rearward-most disk having a conical shape, and support means cooperating with the conical rearward-most disk to absorb and compensate for induced thermal transients and gyroscopic forces so as to absorb induced loads in the rotor both axially and radially.

It is believed that other objects and advantages of the invention will be more apparent and better understood by means of the following detailed description when taken in conjunction with the drawings in which:

FIGURE 1 is a fragmentary side elevation view, partially in cross-section, of a lightweight turbojet axial-flow compressor rotor utilizing the invention;

FIGURE 2 is an enlarged side elevation, partially in cross-section, of the rearward-most disk of the compressor of FIGURE 1, and FIGURE 3 is an alternate embodiment of the present invention.

Turning now more specifically to the drawings, FIGURE 1 is a partial illustration of an axial-flow, jet engine compressor, the flow being in the direction of the large arrows, wherein numeral 10 indicates the outer casing or compressor fluid flow boundary. Illustrated generally at 12 is the compressor rotor comprising a plurality of relatively thin annular disks 14 extending substantially perpendicular to the axis of the rotor. Each of the disks has an enlarged rim area 16 upon which is mounted, in a known manner, a plurality of airfoils or blades 18. The disks are coupled together by coupling means 20 which in the embodiment shown comprise interengaging teeth of a type known in the art. Adjacent the rims or peripheries of the disks 14 and located intermediate thereof are a plurality of cylindrical spacer members 22 which serve to maintain the axial alignment at the rim area and dampen axial vibration of the disks and also to form the inner fluid flow path in the compressor. The disks, interengaging coupling means and the spacers are maintained in rigid engagement by suitable tensioning means, such as the through-bolts or rods, one of which is indicated at 24. The rods may be threaded at either end for engagement with nut means 26. The rotor includes shaft means which, in the embodiment shown, comprise a front stub shaft 28 and a rear stub shaft 30 for rotation within front and rear bearing means (not shown) supported from and within the casing 10 in a known manner.

Turning now more specifically to FIGURE 2, illustrated therein is an enlarged view of the rearward-most disk 32 of the compressor of FIGURE 1. It will be noted that the disk is conical over the portion 34 radially outward of the coupling means 20. Since, as stated above, optimum weight and vibration considerations in lightweight compressors similar to the design shown herein indicate that preferably the coupling means 20 should be located approximately half way between the rim area and axis of the annular disk, the disk is coned only over the radially outer portion. This will help to counteract gyroscopic maneuver forces. Since a lightweight, high-speed compressor supported on two bearings or connected to a small diameter shaft is subjected to extreme flight maneuver forces and extreme thermal transients in high-Mach operation, this "unsupported" rear disk must be restrained from undesirable and excessive axial movement. To put it another way, in the so-called "smooth spool" rotor construction of the illustrated embodiment, the peripheral or disk rim loads are transmitted from the forward disk to the rearward-most disk through the spacer members 22. It has been determined that the lightest possible design which will be acceptable for the necessary rim support and accommodation of both thermal transients and gyroscopic forces is a conical shape. Thus, the axial-centrifugal recovery forces induced by use of the frust-conical shape of the disk 32 will aid in counterflow, two-bearing turbojet engine, for example if it is desirable to effect the lightest possible construction yet provide supporting means capable of accommodating both thermal transients and gyroscopic forces, and a coned rear disk is used, the coned disk-conical support combination of the present invention will effect a greater ability to absorb both axially and radially induced loads than prior art rotor construction.

What I claim and desire to secure by Letters Patent is: